US005246774A

United States Patent [19]

Sakaki et al.

[11] Patent Number: 5,246,774

[45] Date of Patent: Sep. 21, 1993

[54] INK-JET RECORDING MEDIUM AND INK-JET RECORDING METHOD MAKING USE OF IT

[75] Inventors: Mamoru Sakaki, Sagamihara; Yutaka Kurabayashi, Yokohama; Tomomi Nakatsugawa, Kawasaki; Hiroshi Sato, Yokohama; Takahiro Shiratori, Fuchu, all of Japan

[73] Assignee: Canon Kabushiki Kaisha, Tokyo, Japan

[21] Appl. No.: 634,457

[22] Filed: Dec. 27, 1990

[30] Foreign Application Priority Data

Dec. 29, 1989 [JP] Japan ............ 1-341811
Dec. 29, 1989 [JP] Japan ............ 1-341812
Dec. 29, 1989 [JP] Japan ............ 1-341813
Jan. 24, 1990 [JP] Japan ............ 2-12454

[51] Int. Cl.[5] ............ B32B 9/00

[52] U.S. Cl. ............ 428/323; 428/195; 428/206; 428/212; 428/372; 428/914

[58] Field of Search ............ 428/195, 207, 327, 402.22, 428/323, 212, 342, 331, 206, 372, 914; 346/135.1

[56] References Cited

U.S. PATENT DOCUMENTS

| | | | |
|---|---|---|---|
| 4,474,847 | 10/1984 | Schröder et al. | 428/323 |
| 4,664,952 | 5/1987 | Arai et al. | 427/256 |
| 4,733,247 | 3/1988 | Arai et al. | 346/1.1 |
| 4,758,461 | 7/1988 | Akiya et al. | 428/212 |
| 4,832,984 | 5/1989 | Hasegawa et al. | 427/161 |
| 4,956,223 | 9/1990 | Arai et al. | 428/212 |
| 4,965,612 | 10/1990 | Sakaki et al. | 346/1.1 |

FOREIGN PATENT DOCUMENTS

| | | |
|---|---|---|
| 54-57000 | 5/1979 | Japan . |
| 54-59936 | 5/1979 | Japan . |
| 56-148585 | 11/1981 | Japan . |
| 60-49990 | 3/1985 | Japan . |
| 60-54915 | 3/1985 | Japan . |
| 61-57380 | 3/1986 | Japan . |
| 61-63526 | 4/1986 | Japan . |
| 63-89413 | 4/1988 | Japan . |
| 2210375 | 6/1989 | United Kingdom . |

OTHER PUBLICATIONS

Patent Abstracts of Japan, vol. 9, No. 231 [M-414], with respect to Japanese Patent Document No. 60-087089 (May 16, 1985), Sep. 18, 1985. Paperchem, No. 56-12935, Institute of Paper, with respect to Japanese Patent Document No. 60-087089, May 16, 1985.

*Primary Examiner*—Patrick J. Ryan
*Assistant Examiner*—W. Krynski
*Attorney, Agent, or Firm*—Fitzpatrick, Cella, Harper & Scinto

[57] ABSTRACT

A recording medium for ink-jet recording has an ink-receiving layer comprising spherical basic magnesium carbonate, amorphous magnesium carbonate or a mixture of aluminum oxide and basic magnesium carbonate. The recording medium promises a good storage stability of recorded images, i.e. less deterioration due to indoor color changes, together with a high image density.

12 Claims, 4 Drawing Sheets

INK-JET RECORDING MEDIUM AND INK-JET RECORDING METHOD MAKING USE OF IT

BACKGROUND OF THE INVENTION

1. Field of the Invention

The present invention relates to an ink-jet recording medium that can be suitably used in an ink-jet recording method. More particularly it relates to a recording medium having a superior absorption and color-forming performance for a water-based ink, and also capable of achieving a superior storage stability of recorded images obtained. It also relates to an ink-jet recording method making use of such a medium.

2. Related Background Art

Hitherto known recording mediums used for ink-jet recording include;

(1) those comprising an ordinary paper mainly composed of pulp, so made as to have a low degree of sizing as in filter paper or blotting paper; and (2) those comprising a substrate such as an ordinary wood free paper, having a low ink absorption, and an ink-absorbing layer provided thereon using a porous inorganic pigment, as disclosed in Japanese Patent Application Laid-open No. 56-148585.

In an ink-jet recording system that forms a color image with a high quality level and a high resolution, there is a demand for a particularly good image storage stability. Because of such a demand, methods of improving resistance to the fading of images due to sunlight, visible light, ultraviolet light, etc. are known in the art (see, for example, Japanese Patent Applications Laid-open No. 60-49990 and No. 61-57380).

Recently, however, the problem of indoor color changes of recorded images have been highlighted as a problem peculiar to coated papers.

The light-resistance having been hitherto questioned is a problem of the fading of images that is caused by irradiation with, e.g., ultraviolet light or visible light. This is a problem that may arise also with respect to images printed on any paper including all sorts of what is called PPC paper, commonly available, wood free paper, and coated paper for ink-jet recording. The problem of indoor color changes, referred to in the present invention, may also arise in respect of, for example, images formed on a coated paper stored at a place not directly exposed to sunlight, but on the other hand does not arise in respect of images printed on a non-coated paper such as PPC paper. This is a problem different from the above problem of light-resistance.

Since the problem of indoor color changes is a problem peculiar to coated papers as stated above, this problem is considered to arise from the pigment that constitutes a coat layer. The indoor color changes are known to be concerned with the specific surface area of the pigment used, and hence the indoor color changes can be suppressed if usual fillers for paper are used, as exemplified by calcium carbonate, kaolin and talc, having a small specific surface area.

Since, however, image density and chroma are lowered when these fillers are used, there has been the problem that it becomes impossible to obtain images with a high quality level and a high resolution. Inversely, in the case of a coated paper making use of silica, having a large specific surface area and a strong activity, as disclosed, for example, in Japanese Patent Application Laid-open No. 56-185690, an image with a high optical density or chroma can be obtained but on the other hand there has been the disadvantage that the problem of indoor color changes becomes serious.

As stated above, the suppressing of indoor color changes and the problem of image density or chroma conflict with each other, and this problem has not been solved by any prior art.

SUMMARY OF THE INVENTION

Accordingly, an object of the present invention is to provide a recording medium, in particular, a recording medium suited for ink-jet recording, that can promise a superior storage stability of recorded images, in particular, may undergo less deterioration due to indoor color changes, and also can give a high image density.

Another object of the present invention is to provide a recording medium that enables superior color formation of inks applied, and is suited for providing a sharp image with a high quality level, having a broad color reproduction range on the chromaticity coordinates.

Still another object of the present invention is to provide an ink-jet recording method that may cause less deterioration due to the above indoor color changes and can obtain a recorded image with a high density.

The above objects can be achieved by the present invention described below.

As a first embodiment, the present invention provides a recording medium comprising a spherical basic magnesium carbonate.

In a preferred embodiment of the first embodiment, the present invention provides a recording medium comprising a substrate with ink absorption properties and, provided on said substrate, an ink-receiving layer containing a spherical basic magnesium carbonate.

As a second embodiment, the present invention provides a recording medium comprising an amorphous magnesium carbonate.

In a preferred embodiment of the second embodiment, the present invention provides a recording medium comprising a substrate with ink absorption properties and, provided on said substrate, an ink-receiving layer containing an amorphous magnesium carbonate.

As a third embodiment, the present invention provides a recording medium comprising an aluminum oxide and a basic magnesium carbonate which are contained in a proportion of the former/the latter = 1/5 to 3/1.

In a preferred embodiment of the third embodiment, the present invention provides a recording medium comprising a substrate with ink absorption properties and, provided on said substrate, an ink-receiving layer containing an aluminum oxide and a basic magnesium carbonate which are contained in a proportion of the former/the latter = 1/5 to 3/1.

The present invention also provides an ink-jet recording method comprising imparting ink droplets to a recording medium comprising a spherical basic magnesium carbonate.

As another embodiment of the method, the present invention provides an ink-jet recording method comprising imparting ink droplets to a recording medium comprising an amorphous magnesium carbonate.

As still another embodiment of the method, the present invention provides an ink-jet recording method comprising imparting ink droplets to a recording medium comprising an aluminum oxide and a basic magnesium carbonate which are contained in a proportion of the former/the latter = 1/5 to 3/1.

BRIEF DESCRIPTION OF THE DRAWINGS

FIGS. 1A and 1B to FIGS. 3A and 3B are microscope photographs to show particle forms of spherical basic magnesium carbonates used in the present invention.

DESCRIPTION OF THE PREFERRED EMBODIMENTS

Figure 1A:
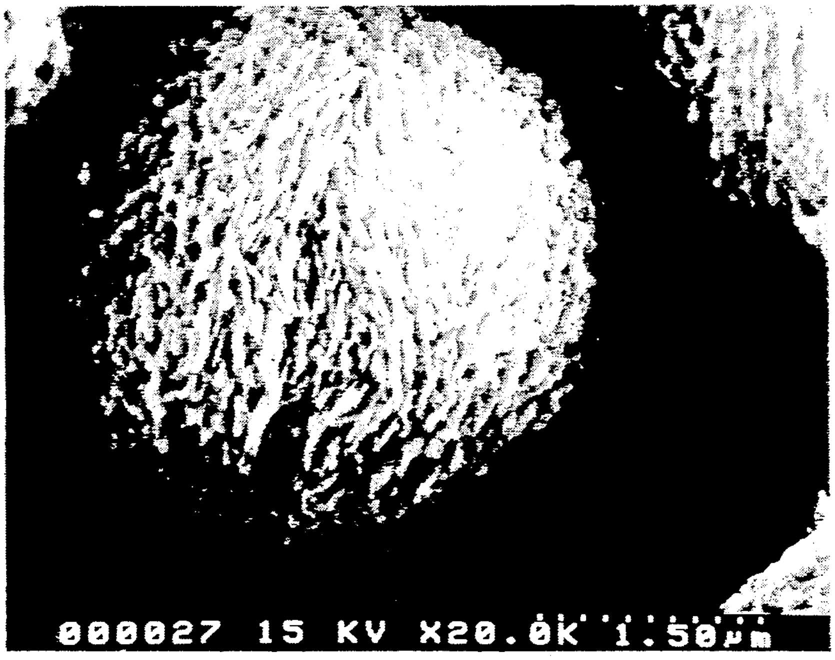

According to what has been found by the present inventors, the indoor color changes of recorded images are considered due to oxidative destruction of a dye. It is presumed that the dye is captured at the surface layer of a recording medium, and, in the case of a coated paper on which an image is formed, the catalytic oxidation reaction is caused at a higher probability with an increase in the specific surface area of the pigment used in the coat layer, i.e., what is referred to as an ink-receiving layer in the present invention, and hence the indoor color changes proceed to that extent.

When, however, a conventional pigment with a small specific surface area is used, the adsorption capacity for a dye becomes insufficient and consequently a less quantity of dye is captured in the vicinity of the surface layer of the ink-receiving layer, so that no image with a high density can be formed. Besides, no sufficient color forming performance of the dye can be obtained and also the color can be reproduced only in a narrow range, so that no sharp image can be obtained.

As a result of intensive studies based on such a finding, the present inventors have discovered that the above indoor color changes can be prevented and also an image with a high density can be obtained when i) as a first embodiment the recording medium comprises a spherical basic magnesium carbonate, ii) as a second embodiment the recording medium comprises an amorphous magnesium carbonate, and iii) as a third embodiment, even in an instance in which a magnesium carbonate (a basic magnesium carbonate) other than the above specific magnesium carbonates (i.e., the spherical magnesium carbonate and the amorphous magnesium carbonate) is used, the recording medium comprises, in particular, the basic magnesium carbonate and an aluminum oxide which are used in combination in a specific mixing ratio. The present invention has been thus accomplished.

The above respective embodiments of the present invention will be described below in detail.

First, reference will be made to the above first embodiment. In the present embodiment, it has been discovered that even a pigment with a small specific surface area can give a sufficient image density when the ink-receiving layer is formed using a spherical basic magnesium carbonate. The mechanism for the operational effect attributable to this spherical basic magnesium carbonate has not been made sufficiently clear, but can be presumed as follows: In a basic magnesium carbonate, a dye adsorption quantity per unit area is larger than, for example, in silica. At the same time, the agglomeration of a basic magnesium carbonate in a spherical form brings about a dense state of packing when a coat layer is formed, compared with usual basic magnesium carbonates agglomerated in a plate form or column form. Hence, the dye is captured at the part nearer to the surface of the coat layer when compared based on the same velocity of ink penetration. In other words, it is presumed that in the case of the spherical basic magnesium carbonate an activated surface is more effectively used than in the case of the basic magnesium carbonates having other forms.

The above first embodiment of the present invention will be more detailed below by giving preferred embodiments.

The spherical basic magnesium carbonate in the present embodiment refers to the basic magnesium carbonate having the form as having been disclosed in Japanese Patent Applications Laid-open No. 60-54915, No. 61-63526 and No. 63-89413. Methods of preparing it are not limited to those disclosed in these publications.

The "spherical" in the present embodiment pertains to the form of agglomerated particles of primary particles, and may not necessarily be in the form of a perfect sphere. As a preferred spherical form, the particle may be spherical in the range of $0.7 \leqq b/a \leqq 1.0$ when its major axis is represented by a and its minor axis by b. As examples of the spherical form, FIGS. 1A and 1B show electron micrographs.

Figure 1B:
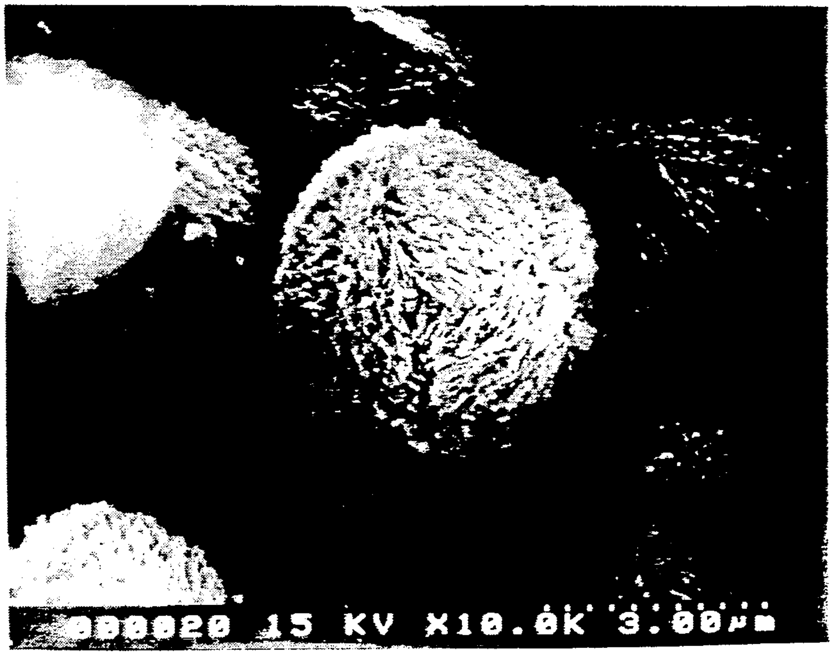
Figure 2A:
Figure 2B:
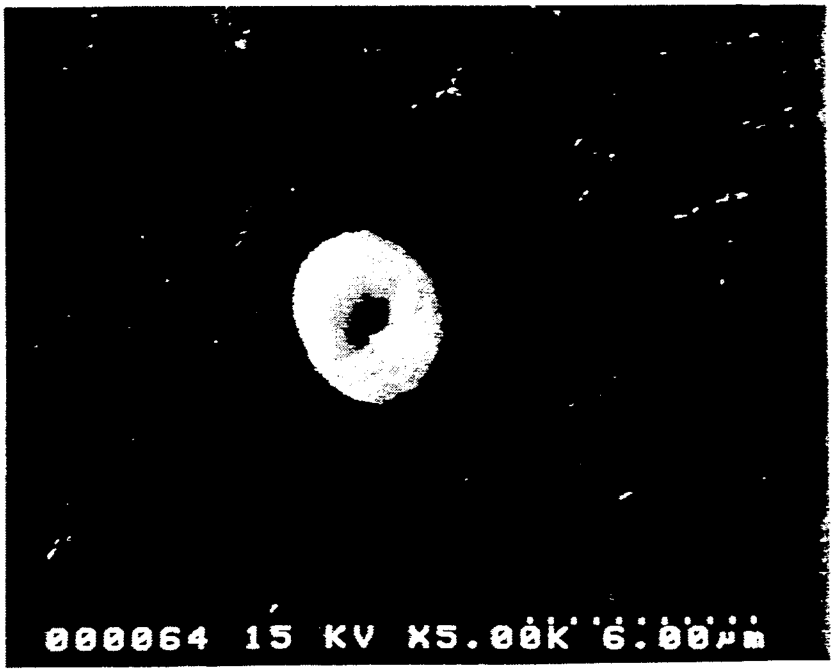
Figure 3A:
Figure 3B:

When, however, reaction conditions are varied in order to control the particle diameter, specific surface area, oil absorption and other pigment properties in the manufacture of such a spherical basic magnesium carbonate, the particles are not necessarily produced in the form as shown in FIGS. 1A and 1B. For example, some of them are produced in the form in which part of a sphere has broken off as shown in FIGS. 2A and 2B, or in the form in which they have agglomerated like petals as shown in FIGS. 3A and 3B. In the present embodiment, an agglomerate is also included in the "spherical" if the part broken off as shown in FIGS. 1A and 1B is not more than a quarter ($\frac{1}{4}$) of the volume of the one assumed to have a spherical form.

In an instance in which the particles that form the agglomerated structure as shown in FIGS. 3A and 3B are relatively so large that the irregularities may become remarkable when the particles having protruded to the outermost side of a spherical body are connected, the line along its outermost periphery is taken in such a manner that the values of a and b become largest if a round form or an elliptical form within the tolerance of the above b/a is applied. This applies not only to those having the form as shown in FIGS. 3A and 3B but also to those having the form as shown in FIGS. 2A and 2B.

In the present embodiment, a material is called the spherical basic magnesium carbonate so long as the spherical particles as described above comprise 85% of the whole particles. In an instance in which agglomerated particles look like those having adhered each other, they are counted as one agglomerated particle if at least a semicircle of the outline of the particle can be recognized.

In the present embodiment, in which the spherical basic magnesium carbonate as described above is used, the invention can be more effective when the velocity of ink penetration is adjusted to not less than 10 $nl/mm^2.sec$ and not more than 60 $nl/mm^2.sec$.

Figure 4:
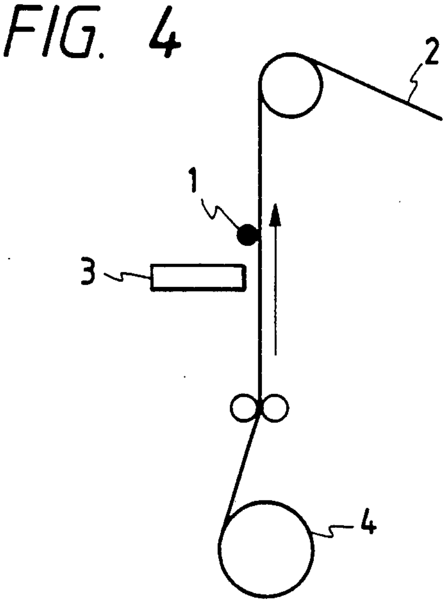
FIG. 4 schematically illustrates an apparatus for measuring the velocity of ink penetration.

Herein the velocity of ink penetration refers to the quantity on the basis of which the penetration is evaluated by examining what second is taken after a given quanity of ink has been shot in per unit area and before the ink fixes. In the present embodiment, the velocity of ink penetration is examined using an apparatus as shown in FIG. 4 in which a bar 1 is provided in such a manner that a load of about 100 g/cm$^2$ is applied to the surface of a recorded image, and a recording medium 2 transported in the direction of an arrow after 0.5 second from the shot of ink is so set as to pass the bar 1. The ink penetration is visually judged by examining whether or not the image having passed the bar runs because of its rubbing against the bar (in the drawing, the numeral 3 denotes an ink-jet head, and 4, rollers). Assume that the ink is shot in the medium in a quantity of 20 nl/mm$^2$.sec which is a limit at which the image runs when rubbed after 0.5 second, the velocity of ink penetration at this time can be given as 20 (nl/mm$^2$.sec)/0.5 (sec)=40 nl/mm$^2$.sec.

As the reason why the effect of the present invention becomes more remarkable when the velocity of ink penetration is set to the above velocity of not less than 10 nl/mm$^2$.sec and not more than 60 nl/mm$^2$.sec, the effect is presumed to be attributable to the dynamic dye adsorption or receptivity.

The ink-receiving layer of the ink-jet recording medium of the present embodiment is comprised of the spherical basic magnesium carbonate described above, a binder, and other additives.

The spherical basic magnesium carbonate should have an average particle diameter of from 0.5 μm to 20 μm, and preferably from 1 μm to 12 μm. An excessively fine particle diameter may result in a lowering of ink absorption, and on the other hand an excessively large particle diameter may cause dusting, undesirably.

Herein the particle diameter corresponds to the value of the major axis a previously described. The average particle diameter is given as a simple average obtained when the a's of not less than one hundred particles observed using an electron microscope are measured. The spherical basic magnesium carbonate may preferably have a particle size distribution such that the number of particles with a particle diameter of 25 μm or less comprises 95% or more of the whole number. More preferably the number of particles with a particle diameter of 15 μm or less should comprise 95% or more of the whole number, and most preferably the number of particles with a particle diameter of 10 μm or less should comprise 95% or more of the whole number.

An excessively large number of particles having an excessively large particle diameter is not preferred since the dispersibility of particles is lowered to form large agglomerates when a slurry is prepared, bringing about an ill influence on the coating suitability or the print suitability.

The specific surface area is a value obtained by the BET method. It is particularly preferred to use a spherical basic magnesium carbonate with a specific surface area of not less than 10 m$^2$/g and not more than 170 m$^2$/g. The one with an excessively small specific surface area can not give a high image density. On the other hand, an excessively large specific surface area may result in a lowering of indoor color change resistance.

In the present embodiment, other inorganic pigments or organic pigments conventionally commonly used may also be used in addition to the above spherical basic magnesium carbonate so long as the achievement of the object of the present invention may not be hindered.

The second embodiment of the present invention will be described below in detail.

The second embodiment of the present invention is entirely the same as the first embodiment described above, except that an amorphous magnesium carbonate is used in place of the spherical basic magnesium carbonate. More specifically, in the present embodiment, it has been discovered that even a pigment with a small specific surface area can give a sufficient image density when the ink-receiving layer is formed using an amorphous magnesium carbonate. The action of this amorphous magnesium carbonate has not been made sufficiently clear, but can be presumed as follows: In an amorphous magnesium carbonate, a dye adsorption quantity per unit area is larger than, for example, in silica. At the same time, use of the amorphous magnesium carbonate brings about a dense state of packing when a coat layer is formed, compared with usual basic magnesium carbonates agglomerated in a plate form or column form. Hence, the dye is captured at the part nearer to the surface of the coat layer when compared based on the same velocity of ink penetration. In other words, it is presumed that in the case of the amorphous magnesium carbonate an active surface is more effectively used than in the case of the magnesium carbonates having other forms.

The above second embodiment of the present invention will be more detailed below by giving preferred embodiments.

The amorphous magnesium carbonate in the present embodiment refers to the magnesium carbonate obtained by the method disclosed in, for example, Japanese Patent Application Laid-open No. 54-57000. It has an average particle diameter of from 0.5 μm to 20 μm, and preferably from 0.5 μm to 10 μm. An excessively large particle diameter may cause the problem of dusting, and on the other hand an excessively small particle diameter may result in a lowering of ink absorption, undesirably. The average particle diameter is a value obtained by the Coulter counter method, and refers to the particle diameter that comes to be 50% in terms of a cumulative value of number distribution.

The specific surface area is a value obtained by the BET method. It is particularly preferred to use an amorphous magnesium carbonate with a specific surface area of not less than 10 m$^2$/g and not more than 170 m$^2$/g. The one with an excessively small specific surface area can not give a high image density. On the other hand, an excessively large specific surface area may result in a lowering of indoor color change resistance.

The amorphous magnesium carbonate used in the present embodiment has a smaller BET specific surface area than inorganic pigments such as silica usually used in ink-jet recording mediums. However, the specific surface area that can effectively act is considered larger than that of silica or the like. Most of silica commonly have a BET specific surface area in a high value and hence bring about a high image density, but inversely tend to result in a poor indoor color change resistance.

In the present embodiment, other inorganic pigments or organic pigments conventionally commonly used may also be used in addition to the above amorphous magnesium carbonate so long as the achievement of the object of the present invention may not be hindered.

In the present embodiment, in addition to the above amorphous magnesium carbonate, the spherical basic magnesium carbonate used in the first embodiment described above may also be used in combination.

The ink-receiving layer of the ink-jet recording medium of the present embodiment is comprised of the amorphous magnesium carbonate described above, a binder, and other additives.

In the first embodiment and second embodiment described above, other inorganic pigment or organic pigment used in combination with the spherical basic magnesium carbonate or amorphous magnesium carbonate includes silica, alumina and calcium carbonate. Magnesium carbonates other than the above spherical basic magnesium carbonate and amorphous magnesium carbonate can also be mixed. The organic pigment includes urea resins. These may preferably be used in a mixing ratio of the spherical or amorphous magnesium carbonate to the inorganic or organic pigment, ranging from 9/1 to 1/5 in weight ratio. These are mixed mainly for the purpose of further improving image density. However, their use in a mixing ratio of more than 9/1 can not bring about a greater improvement than the sole use of the spherical basic magnesium carbonate or amorphous magnesium carbonate. Their use in a mixing ratio of less than 1/5 can bring about a more improvement than the sole use of the spherical basic magnesium carbonate or amorphous magnesium carbonate but tends to make the indoor color change serious, resulting in no effect of mixing.

A particular preferred embodiment of the above pigment used in combination is a pigment having an average particle diameter of not more than ⅓ of the average particle diameter of the spherical basic magnesium carbonate, or a pigment having an average particle diameter of not more than ⅓ of the average particle diameter of the amorphous magnesium carbonate. In the case when the pigment having the above specific average particle diameter is used, it may preferably be a porous inorganic pigment. Namely, the porous inorganic pigment used in combination, having an average particle diameter of ⅓ of the average particle diameter of the spherical basic magnesium carbonate or amorphous magnesium carbonate is presumed to act in the manner that the spherical basic magnesium carbonate or amorphous magnesium carbonate, while filling up the space in which the coat layer is formed, may pack the space without stopping up the pores through which the ink penetrates.

According to a finding the present inventors have reached, the porous inorganic pigment used in combination with the spherical basic magnesium carbonate or amorphous magnesium carbonate may preferably be used in a proportion of the former to the latter, of from 1/5 to 9/1 in weight ratio.

According to another finding the present inventors have reached, even in a recording medium that may cause a serious indoor color change of an image when its coat layer is formed using alone the porous inorganic pigment to be mixed, no additivity is made up in the degree of indoor color changes as a result of its use in combination with the spherical basic magnesium carbonate or amorphous magnesium carbonate, and the indoor color changes can be remarkably suppressed when the spherical basic magnesium carbonate or amorphous magnesium carbonate is contained in an amount of about 20% by weight. This is an effect that can not be usually expected if two kinds of pigments are merely mixed, and is a new finding on which the present invention is based. Thus, the range of selection for the porous inorganic pigment that can be used in combination is made wider.

Preferred examples of the porous inorganic pigment that can be used in the present embodiment are silica obtained by the wet method, aluminum silicate and calcium silicate. The examples are not limited to these. Particularly preferred porous inorganic pigment is aluminum oxide. A particularly remarkable effect can be obtained when the ink-receiving layer is formed using this aluminum oxide in combination with the spherical basic magnesium carbonate or amorphous magnesium carbonate. More specifically, an ink-jet recording medium that can achieve much superior color-forming performance and has much better indoor color change resistance can be provided when the aluminum oxide is used.

The aluminum oxide herein refers to those obtained by a method in which aluminum hydroxide obtained by heat-treating bauxite with caustic soda is fired, a method in which aluminum hydroxide obtained by subjecting metal aluminum pellets to spark discharging in water is fired, and a method in which aluminum chloride is vaporized and then oxidized in a gaseous phase. Its crystal structure may be of $\alpha$-form, $\gamma$-form, $\delta$-form, $\eta$-form, $\theta$-form or the like, and those with any crystal structure can be used. Of these, preferred are those obtained by the BET method and having a specific surface area of not less than 100 $m^2/g$. An aluminum oxide with an extremely small specific surface area can not bring about a remarkable effect in respect of color-forming performance, obtainable by the above combination.

The porous inorganic pigment used in combination may preferably have a particle size distribution such that particles with a diameter larger than the average particle diameter of the magnesium carbonate used are present in a percentage of less than 5%.

The third embodiment of the present invention will be described below.

The third embodiment of the present invention is an embodiment in which a magnesium carbonate other than the spherical basic magnesium carbonate and the amorphous magnesium carbonate in the first and second embodiments may be used.

More specifically, according to the present embodiment, the recording medium comprises aluminum oxide particles and basic magnesium carbonate particles which are contained in a weight ratio of the former to the latter, ranging from 1/5 to 3/1.

The present inventors have discovered that when these pigments are incorporated into the recording medium in a specific ratio it is possible to obtain a cooperative effect that can not be expected from the combination of the properties possessed by each pigment.

The third embodiment of the present invention will be more detailed below by giving preferred embodiments.

The aluminum oxide particles used in the present embodiment may preferably have a BET specific surface area of from 40 $m^2/g$ to 200 $m^2/g$, and more preferably from 60 $m^2/g$ to 170 $m^2/g$. When such a pigment is incorporated, the effect of capturing dyes in the surface layer of the ink-receiving layer can be improved. Particles with an extremely small specific surface area can bring about no sufficient effect of capturing dyes, and on the other hand those with an extremely large specific surface area may make serious the problem of indoor color changes.

The above aluminum oxide particles may preferably have an average particle diameter in the range of from 1 nm to 10 $\mu$m, and more preferably from 0.01 $\mu$m to 3 $\mu$m. Use of particles with an excessively large average particle diameter may result in an increase in blurs of the dots formed by printing or cause feathering to bring about a lowering of the quality level of prints.

The aluminum oxide particles that can be used in the present embodiment are conventionally known in the art, and it is possible to use those obtained by a method in which aluminum hydroxide obtained by heat-treating bauxite with caustic soda is fired, a method in which aluminum hydroxide obtained by subjecting metal aluminum pellets to spark discharging in water is fired, and a method in which aluminum chloride is vaporized and then oxidized in a gaseous phase. It is possible to use those having any crystal structure of $\alpha$-form, $\gamma$-form, $\delta$-form, $\eta$-form, $\theta$-form or the like, which can be obtained depending on conditions for heat treatment.

The aluminum oxide particles have the properties that they can impart a sufficient color-forming performance of dyes even though they are particles having a small specific surface area, compared with silica, calcium carbonate, kaolin, etc., which have been conventionally used as loading materials for paper.

This is presumably due to the following: The aluminum oxide particles have cationic surfaces, different from other particles, and hence can ionically adsorb a dye having an acidic functional group, so that the ability of adsorbing dyes per unit surface area can be high.

The aluminum oxide particles can obtain a sufficient color-forming performance of dyes even though they have a relatively small specific surface area as described above. Hence, the indoor color change resistance of the recording medium making use of such aluminum oxide particles is greatly more improved than those making use of conventional silica type pigments, to the extent that the pigment with a small specific surface area is used.

Problems that may arise when such aluminum oxide particles are used are that the ink absorption becomes short because of a low water absorption inherent in the particles themselves and also that, even though more improved than silica types, the indoor color change resistance is still insufficient compared with other recording mediums.

To describe next the basic magnesium carbonate used in the present embodiment, it may preferably have a BET specific surface area in the range of from 10 $m^2/g$ to 170 $m^2/g$. When such a pigment is incorporated, it is possible to impart a superior effect of suppressing indoor color changes. Particles with an extremely large specific surface area can not bring about a sufficient effect of suppressing indoor color changes. On the other hand, those with an extremely small specific surface area may result in an insufficiency in the effect of capturing dyes even if used in combination with the above aluminum oxide particles.

The basic magnesium carbonate may preferably have an average particle diameter in the range of from 1 $\mu$m to 20 $\mu$m, and more preferably from 1 $\mu$m to 8 $\mu$m. Use of particles with an excessively large average particle diameter may result in an increase in blurs of the dots formed by printing or cause feathering to bring about a lowering of the quality level of prints.

The basic magnesium carbonate particles used in the present embodiment are conventionally known in the art. In usual instances, they can be obtained by, for example, dispersing magnesium oxide in water with stirring to form magnesium hydroxide, and thereafter blowing carbonic acid gas into the slurry to make it into a carbonate. It is possible in the present embodiment to use not only a product completed into a 100% carbonate but also a product partially containing magnesium oxide or magnesium hydroxide.

The basic magnesium carbonate particles can also give an image with a high density even though they are particles having a small specific surface area, compared with conventional silica, calcium carbonate, kaolin, etc. commonly used as loading materials for paper.

This is presumably due to the fact that the basic magnesium carbonate particles are basic and hence the ability of adsorbing dyes per unit surface area can be high.

Additional features obtainable when the basic magnesium carbonate particles are used are that an outstanding suppressive effect can be obtained in regard to the indoor color changes of images, compared with other inorganic pigments of a silica type, an alumina type, etc. having substantially the same specific surface area, and also that the particles have a special form like petals and hence have superior water absorption properties.

Although the mechanism by which the indoor color change suppressive effect is superior to that of other pigments when the basic magnesium carbonate particles are used is unclear, it has become possible even in recorded images obtained using an ink-jet recording method to give an image fastness comparable to that of ordinary printing especially when the basic magnesium carbonate particles are used in the ink-receiving layer.

As a problem that may arise when the basic magnesium carbonate particles are used, there is the problem that the color-forming performance of dyes is still unsatisfactory and the chroma may be lowered especially when the ink is adhered in a large quantity.

The recording medium of the present embodiment is characterized in that the above aluminum oxide particles and the basic magnesium carbonate particles are contained in a proportion of 1/5 to 3/1 in weight ratio. When they are contained in the proportion of this range, there is no difference in the indoor color change suppressive effect from the case when the basic magnesium carbonate particles are used alone, in spite of the employment of the aluminum oxide particles. In addition, it is also possible to dramatically settle the problem of lowering chroma, inherently involved in trace-amount coated paper making use of basic magnesium carbonate particles. There also occurs no deficiency in ink absorption that may be caused by the aluminum oxide particles or the problem of bleeding or feathering ascribable thereto.

If the aluminum oxide particles are contained in an amount exceeding the above range, the effect of suppressing indoor color changes become insufficient although the color-forming performance of dyes can be excellent. If the basic magnesium carbonate particles are in an excessively large amount, it is impossible to obtain an image with a sufficient density and chroma.

In the recording medium of the present embodiment, the ink-receiving layer is mainly formed of pigments and a binder. As the pigments that constitute the ink-receiving layer, it is possible to also use, in addition to the aluminum oxide particles and basic magnesium carbonate particles described above, other inorganic pigment or organic pigment hitherto commonly used, so long as it is within the range of not exceeding 40% by weight, and more preferably within the range of not exceeding 20% by weight, based on the total weight of the pigments constituting the ink-receiving layer.

Other constituents of the recording medium of the present invention according to any of the first to third embodiments described above will be described below. Except those described above, the constituents of the recording medium of the present invention may be all common to the recording mediums according to the first to third embodiments.

In the first place, the recording medium of the present invention may have a substrate, which is not an essential component. In other words, the ink-receiving layer itself may function as a support. In a preferred embodiment, however, the recording medium of the present invention is comprised of a substrate and an ink-receiving layer provided on the substrate. The substrate may preferably comprise a base paper capable of absorbing an ink, but may not be particularly limited to this. For example, a polymeric film made of polyester or the like, glass, a metallic sheet or plate, a wood board, etc. may also be used.

The binder that can be used in the present invention may include, for example, conventionally known water-soluble polymers such as polyvinyl alcohol, starch, oxidized starch, cationized starch, casein, carboxymethyl cellulose, gelatin, and hydroxyethyl cellulose, and water-dispersed polymers such as SBR latex and polyvinyl acetate emulsion, which may be used alone or in combination of two or more kinds.

In the present invention, the pigment and the binder may preferably be used in a proportion of the pigment to the binder (P/B), ranging from 10/1 to 1/4, and more preferably from 6/1 to 1/1. Use of the binder in an extremely large amount results in a lowering of the ink absorption properties possessed by the ink-receiving layer. On the other hand, use of the pigment in an extremely large amount may cause serious dusting of the ink-receiving layer. Thus these are undesirable.

In the present invention, the ink-receiving layer may optionally be further incorporated with additives such as a dye fixing agent (an anti-hydration agent), a fluorescent brightener, a surface active agent, an anti-foaming agent, a pH adjuster, a mildewproofing agent, an ultraviolet absorbent, an antioxidant, a dispersant and a viscosity reducing agent. These additives may be arbitrarily selected from conventionally known compounds, depending on the purpose.

As an example for the additives, the dye fixing agent will be described. When any of the following dye fixing agents is used in combination, the water resistance of the image formed can be improved.

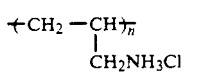
(1)

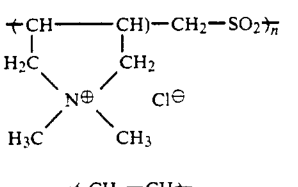
(2)

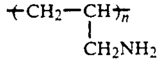
(3)

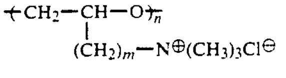
(4)

The above examples are merely illustrative, and the present invention is by no means limited to these. The dye fixing agent has a different effect on the anti-hydration, depending on the dye used in the ink-jet recording. Accordingly, its combination with the dye used in the recording should be well taken into account.

In preparing the recording medium of the present invention, an aqueous coating solution containing the pigment(s), the binder and other additives, as previously described, is applied to the surface of the substrate by a known method as exemplified by roll coating, blade coating, air-knife coating, gate roll coating, or size press coating, followed by drying using, for example, a hot-air drying oven or a heated drum. Thus the recording medium of the present invention can be obtained.

In order to smooth the surface of the ink-receiving layer or to increase the surface strength of the ink-receiving layer, the recording medium may further be super-calendered.

The pigment coating weight in the ink-receiving layer may be in the range of from 0.2 g/m$^2$ to 50 g/m$^2$, and preferably from 0.2 g/m$^2$ to 20 g/m$^2$. When the coating weight is small, part of the surface of the substrate may be exposed. An ink-receiving layer with a pigment coating weight of less than 0.2 g/m$^2$ may have no effect on the color-forming performance of dyes, even when compared with an instance in which no ink-receiving layer is provided. On the other hand, an ink-receiving layer with a pigment coating weight of more than 50 g/m$^2$ may cause dusting of the coat layer, undesirably. When the coating weight is expressed in thickness, the coating weight of pigment may preferably be in such a range that may give a thickness of from 0.5 to 100 $\mu$m.

In the first embodiment previously described, it has been noted that the recording medium may more preferably have a velocity of ink penetration of from 10 nl/mm$^2$.sec to 60 nl/mm$^2$.sec. In order to obtain better effects, such a velocity of ink penetration should preferably be similarly adjusted also in respect of the second and third embodiments.

A method of controlling the velocity of ink penetration in the recording medium obtained in the manner as described above will be described below. In the case when the substrate is comprised of a film having no ink absorption properties as in the case of a plastic film, the velocity of ink penetration (hereinafter often "V") in the recording medium is determined by the components, and their proportions, of a coat layer as a matter of course.

The factors that determine the velocity of ink penetration are the oil absorption of a pigment, the average particle diameter, the particle size distribution (Dav), the pigment coating weight, the pigment/binder ratio, the kind of binder, the kind of additive, the amount thereof, and also, in the case when the substrate comprises a base paper having ink absorption properties, the velocity of ink penetration in the base paper (i.e., the degree of sizing), the smoothness, and so forth.

Generally speaking, the velocity of ink penetration in the recording medium is determined by the above factors complicatedly entangled with each other, and it is difficult to discuss how to find the ranges of each value. In the case when the substrate comprises a base paper having ink absorption properties, the base paper tends to most influence the V, and hence it is most preferred to select such a base paper that can give an optimum V, according to the degree of sizing of the base paper. When it is necessary to make a micro-adjustment on the V, the relation between the following properties and the V may be taken into account so that the desired V can be obtained.

In order to bring the V to a larger value, for example, the oil absorption of the pigment may be increased, the particle size distribution may be broadened, the coating weight may be increased, or the pigment/binder ratio may be enlarged.

As for the ink itself that is used in carrying out ink-jet recording on the recording medium described above, any known inks can be used without problems. As to a recording agent, it is possible to use water-soluble dyes as typified by direct dyes, acidic dyes, basic dyes, reactive dyes and food dyes, which can be used without any particular limitations so long as they are for use in usual ink-jet recording.

Such water soluble dyes are used in an amount of from about 0.1 to 20% by weight in conventional inks, and may also be used in the same amount in the present invention.

A solvent used in the water-based ink used in the present invention includes water or a mixed solvent of water and a water-soluble organic solvent. Particularly preferred is a mixed solvent of water and a water-soluble organic solvent, containing as the water-soluble organic solvent a polyhydric alcohol having the effect of preventing the ink from evaporating.

The method for carrying out recording by imparting the above ink to the recording medium previously described may preferably include ink-jet recording methods. Such methods may be of any system so long as it is a system that can effectively release an ink from nozzles and impart the ink to a recording medium serving as a target.

In particular, what can be effectively used is the method disclosed in Japanese Patent Application Laid-open No. 54-59936, which is an ink-jet recording system in which an ink having received the action of heat energy causes an abrupt change in volume and the ink is ejected from nozzles by the force of action produced by this change in state.

The present invention will be described below in greater detail by giving Examples and Comparative Examples. In the following, "part(s)" or "%" is by weight unless particularly noted.

EXAMPLES 1 TO 6

To prepare recording mediums according to the present invention, spherical basic magnesium carbonates (A, B) each having the following average particle diameter, maximum particle diameter, specific surface area and oil absorptivity were synthesized (Table 1; syntheses were carried out with changes of reaction conditions by the same method as disclosed in Japanese Patent Application Laid-open No. 60-54915).

TABLE 1

| Sample | Average particle diameter (μm) | Specific surface area ($m^2/g$) | Oil absorption (cc/100 g) |
|---|---|---|---|
| A | 8.0 | 35 | 130 |
| B | 5.4 | 45 | 110 |

The maximum particle diameter of the sample A was 15 μm, and that of the sample B was 12.5 μm.

Next, the samples A and B and the following substrates I to III as shown in Table 2 were combined to prepare recording mediums of the present invention by the procedure described below.

TABLE 2

| Substrate | Material | Basis weight ($m^2/g$) | Bristow value ($ml/m^2$) |
|---|---|---|---|
| I | PET film | — | — |
| II | paper | 70 | 30 |
| III | paper | 70 | 15 |

In Table 2, the Bristow value refers to a quantity that represents the quantity of penetration in 0.08 second of a paper-head contact time, of an ink prepared by dissolving 2% by weight of a black dye FB-II in a mixed solvent comprising water containing 20% of diethylene glycol. These values were measured in a manner similar to the method described in JTAPPI Paper Pulp Test Method No. 51.

The recording mediums were prepared in the following way:

First, 15 parts of spherical basic magnesium carbonate is mixed with 85 parts of water, and the mixture is stirred for 15 minutes at 10,000 rpm using a commercially available homogenizer. Thereafter, the resulting solution and a binder solution (an aqueous 10% polyvinyl alcohol solution) having been separately prepared are mixed so as to give the desired pigment/binder ratio (in terms of solid content), and the mixture is stirred for 5 minutes. Thereafter, various additives are optionally added in given amounts, followed by stirring for 5 minutes to give a coating solution.

The coating solution thus obtained was applied using a Mayer bar coater, and the coating formed was dried at 110° C. for 5 minutes, followed by super-calendering. The recording mediums of the present invention were thus obtained.

In all the recording mediums, used as the binder was a material containing polyvinyl alcohols PVA117 (degree of saponification: 98.5 mol %; degree of polymerization: 1,700) and PVA217 (degree of saponification: 89 mol %; degree of polymerization: 1,700), produced by Kuraray Co., Ltd., in a proportion of PVA117/PVA217=8/2.

Table 3 shows together the kind of the spherical basic magnesium carbonate used in the recording medium thus obtained, the kind of substrate, the pigment/binder ratio, the coating weight, the kind of additive, the proportion (%) of the additive to the pigment, and the velocity of ink penetration in the resulting recording mediums.

TABLE 3

| Example | Basic $MgCO_3$ | Substrate | Pigment/ binder ratio | Coating weight ($g/m^2$) | Additive (%) vs. pigment | Ink penetration velocity ($nl/mm^2 \cdot s$) |
|---|---|---|---|---|---|---|
| 1 | A | I | 2/1 | 15 | — | 15 |
| 2 | A | II | 2/1 | 6 | — | 70 |
| 3 | B | II | 3/1 | 6 | — | 56 |
| 4 | B | II | 2/1 | 6 | — | 45 |
| 5 | B | III | 2/1 | 6 | — | 32 |
| 6 | B | III | 2/1 | 6 | * | 25 |

*Polyallylamine hydrochloride produced by Nitto Boseki Co., Ltd. (trade name: PAAHCl-3L; molecular weight: 10,000; amount: 20 wt. %)

Using an ink having the following composition, ink-jet recording was carried out on the recording mediums of Examples 1 to 6, in a recording ink density of 8 $nl/mm^2$ per single color.

| Composition of ink | |
|---|---|
| Dye | 5 parts |
| Diethylene glycol | 20 parts |
| Water | 80 parts |
| Dye | |
| Y: C.I. Direct Yellow 86 | |
| M: C.I. Acid Red 35 | |
| C: C.I. Direct Blue 199 | |
| Bk: C.I. Food Black 2 | |

As evaluation items, two items of (1) image density and (2) indoor storage stability were picked up to make evaluation.

In respect of the image density, reflection density OD (Bk) at black-solid printed areas was measured using a Macbeth reflection densitometer RD-918. In respect of the indoor storage stability, an environment where the open air was well circulated and no direct sunlight streamed was made up in an office, and printed materials in black- and cyan-solid as a monochromatic color as well as in red- (yellow+magenta), green- (yellow+cyan) and blue- (magenta+cyan) solid as a mixed color were left there to measure color differences (ΔE*) after 1 month and after 3 months using a color analyzer CA-35, manufactured by Murakami Shikisai Kenkyusho K.K. Results of measurement are shown in Table 4.

TABLE 4

| Example | OD(Bk) | ΔE* After 1 month Bk/C/R/G/Bl | ΔE* After 3 months Bk/C/R/G/Bl |
|---|---|---|---|
| 1 | 1.40 | 3.0/7.0/2.0/4.5/6.4 | 3.5/8.5/3.0/6.0/7.8 |
| 2 | 1.30 | 4.0/6.8/1.8/4.1/6.0 | 5.1/8.9/2.8/6.5/8.4 |
| 3 | 1.32 | 2.4/5.4/1.5/2.7/5.0 | 5.4/9.4/2.5/7.0/8.8 |
| 4 | 1.37 | 2.9/6.9/1.8/4.4/6.3 | 3.8/8.7/2.9/6.3/8.0 |
| 5 | 1.41 | 3.2/5.3/2.4/2.9/4.8 | 4.2/8.4/3.3/6.0/7.9 |
| 6 | 1.42 | 2.9/4.9/2.2/2.5/4.5 | 4.8/9.7/3.0/7.3/9.3 |

Color changes are visually recognized when the ΔE* is about 10. Color changes are little visually perceived when the value is less than that.

COMPARATIVE EXAMPLE 1

As a comparative example, a recording medium was prepared in the same manner as in Example 6 except that the spherical basic magnesium carbonate was replaced with a P-type magnesium carbonate (produced by Ube Chemical Industries, Ltd.; acicular crystals; average particle diameter: 12.8 μm; specific surface area: 15 $m^2/g$; oil absorption: 220 cc/100 g).

COMPARATIVE EXAMPLE 2

As another comparative example, a recording medium was prepared in the same manner as in Example 6 except that the spherical basic magnesium carbonate was replaced with a heavy magnesium carbonate (produced by Kohnoshima Kagaku K.K.; tabular crystals; average particle diameter: 0.47 μm; specific surface area: 27 $m^2/g$; oil absorption: 79 cc/100 g).

Evaluation was made on the above comparative recording mediums in the same manner as in the above Examples, to reveal that the indoor color changes were on substantially the same level as in Example 6, but the image density was too low to obtain sharp images (see Table 5).

TABLE 5

| Comp. example | Ink penetration velocity ($nl/mm^2 \cdot s$) | OD (Bk) | ΔE* after 1 month Bk/C/R/G/Bl | ΔE* after 3 months Bk/C/R/G/Bl |
|---|---|---|---|---|
| 1 | 40 | 1.10 | 2.0/5.3/2.2/3.0/4.9 | 3.5/7.5/3.2/5.0/7.0 |
| 2 | 27 | 1.20 | 3.2/6.2/2.4/4.0/5.9 | 4.8/8.0/3.3/5.5/7.5 |

EXAMPLES 7 to 11

To prepare recording mediums according to the present invention, spherical basic magnesium carbonates (C, D), each having the following average particle diameter, specific surface area and oil absorption were synthesized (Table 6; syntheses were carried out with changes of reaction conditions by the same method as disclosed in Japanese Patent Application Laid-open No. 60-54915).

Finesil K-41 (silica) (a) and AKP-G (γ-alumina) (b) used as porous inorganic pigments used in combination with the spherical basic magnesium carbonates A and B are also shown in Table 6.

TABLE 6

| Sample | Manufacturer | Average particle diameter (μm) | Specific surface area ($m^2/g$) |
|---|---|---|---|
| C | — | 10.2 | 30 |
| D | — | 6.7 | 40 |
| a | Tokuyama Soda | 1.8 | 320 |
| b | Sumitomo Chemical | 0.5 | 140 |

Next, in combination of the above spherical basic magnesium carbonate, the porous inorganic pigment and a base paper having a degree of sizing of 3 seconds calculated on the basis of a basis weight of 65 $g/m^2$, recording mediums 7 to 11 of the present invention were prepared by the procedure described below.

First, 15 parts of spherical basic magnesium carbonate is mixed with 85 parts of water, and the mixture is stirred for 5 minutes at 10,000 rpm using a commercially available homogenizer. Similarly, 10 parts of a porous inorganic pigment is mixed with 90 parts of water and the mixture is stirred.

Thereafter, the resulting solutions and an aqueous binder solution (an aqueous 10% polyvinyl alcohol solution) having been separately prepared are mixed so as to give the desired pigment/binder ratio (in terms of solid content), and the mixture is stirred for 5 minutes. Thereafter, various additives are optionally added in given amounts, followed by stirring for 5 minutes to give a coating solution.

The coating solution thus obtained was applied using a Mayer bar coater, and the coating formed was dried at 110° C. for 5 minutes, followed by super-calendering. The recording mediums of the present invention were thus obtained.

In all the recording mediums, used as the binder was a material containing polyvinyl alcohols PVA117 (degree of saponification: 98.5 mol %; degree of polymerization: 1,700) and PVA217 (degree of saponification: 89 mol %; degree of polymerization: 1,700), produced by Kuraray Co., Ltd., in a proportion of PVA117/PVA217=8/2.

Table 7 shows together the composition of the pigments used in the recording mediums 7 to 11 thus obtained, the pigment/binder ratio, the coating weight of the ink-receiving layer, the kind of additive, and the proportion (%) of the additive to the pigment.

TABLE 7

| Example | Composition of pigments | Pigment/binder ratio | Additive (%) vs. pigment | Coating weight (g/m²) |
|---|---|---|---|---|
| 7 | C 6 parts/a 4 parts | 2/1 | — | 15 |
| 8 | C 6 parts/b 4 parts | 2/1 | — | 15 |
| 9 | D 7 parts/a 3 parts | 2/1 | — | 5 |
| 10 | D 7 parts/b 3 parts | 2/1 | — | 5 |
| 11 | D 7 parts/b 3 parts | 3/1 | * | 5 |

*Polyamine sulfonate produced by Nitto Boseki Co., Ltd. (trade name: PAS-A-120S; molecular weight: $10^5$; amount: 20 wt. %)

Using an ink having the following composition, ink-jet recording was carried out on the recording mediums of Examples 7 to 11, in a recording ink density of 8 nl/mm² per single color.

| Composition of ink | |
|---|---|
| Dye | 5 parts |
| Diethylene glycol | 20 parts |
| Water | 80 parts |
| Dye | |
| Y: C.I. Direct Yellow 86 | |
| M: C.I. Acid Red 35 | |
| C: C.I. Direct Blue 199 | |
| Bk: C.I. Food Black 2 | |

As evaluation items, two items of (1) image density and (2) indoor storage stability were picked up to make evaluation.

In respect of the image density, reflection density OD (Bk) at black-solid printed areas was measured using a Macbeth reflection densitometer RD-918. In respect of the indoor storage stability, an environment where the open air was well circulated and no direct sunlight streamed was made up in an office, and printed materials in black- and cyan-solid as a monochromatic color as well as in red- (yellow+magenta), green- (yellow+cyan) and blue- (magenta+cyan) solid as a mixed color were left there to measure color differences (ΔE*) after 1 month and after 3 months using a color analyzer CA-35, manufactured by Murakami Shikisai Kenkyusho K. K. Results of measurement are shown in Table 8.

TABLE 8

| Example | OD(Bk) | ΔE* After 1 month Bk/C/R/G/Bl | ΔE* After 3 months Bk/C/R/G/Bl |
|---|---|---|---|
| 7 | 1.43 | 2.0/8.5/3.8/5.5/8.0 | 3.5/12.5/6.0/6.8/11.5 |
| 8 | 1.40 | 1.8/6.4/2.4/3.8/5.8 | 2.9/7.8/4.8/6.0/7.3 |
| 9 | 1.48 | 2.0/8.2/3.9/5.8/7.8 | 4.0/13.1/6.2/6.8/11.8 |
| 10 | 1.45 | 2.1/5.9/2.5/3.0/5.2 | 3.0/7.6/4.4/6.0/7.0 |
| 11 | 1.45 | 3.0/5.5/2.6/2.8/5.3 | 2.8/6.4/4.2/5.0/5.8 |
| 12 | 1.30 | 3.0/9.0/5.0/6.0/7.0 | 5.0/13.0/7.0/9.0/10.0 |

Examples 8 and 10 showed less differences in line width of images between monochromatic areas and mixed-color areas, and hence achieved a higher resolution, than Examples 7 and 9.

Examples 8, 10 and 11 showed less indoor color changes than other Examples.

COMPARATIVE EXAMPLE 3

Next, as a comparative example, a recording medium was prepared in the same manner as in Example 11 except that only the pigment a was used, and evaluation was made in the same manner as in Examples 7 to 11, to reveal that as shown in Table 9 the recording medium obtained a high image density but a poor indoor color change resistance, showing that the former was incompatible with the latter.

EXAMPLE 12

A recording medium was prepared in the same manner as in Example 7 except that as the pigment the porous inorganic pigment used in the example was replaced with silica P-78D (average particle diameter: 80. μm; specific surface area: 300 m²/g), produced by Mizusawa Industrial Chemicals, Ltd.), and evaluation was made in the same manner as in Examples 7 to 11.

TABLE 9

| Comp. Example | OD (Bk) | ΔE* After 1 month Bk/C/R/G/Blue | ΔE* After 3 months Bk/C/R/G/Blue |
|---|---|---|---|
| 3 | 1.55 | 10.0/20.0/10.0/13.0/19.0 | 25.0/38.0/18.0/24.0/35.0 |

REFERENCE EXAMPLE

Preparation of amorphous magnesium carbonate

Making reference to the disclosure in Japanese Patent Application Laid-open No. 54-57000, an aqueous solution of magnesium chloride and sodium carbonate was kept at a temperature of 70° C. and stirred for 3 hours or more to carry out reaction. The reaction product was dried by heating at a temperature of 120° C. for 1 hour or more. A magnesium orthocarbonate was thus synthesized.

Subsequently, 70 parts of water was added to 30 parts of the above normal magnesium carbonate. While the temperature was kept at 60° to 70° C., the mixture was stirred for 2 hours or more to carry out reaction. The reaction product was dried by heating at a temperature of 120° C. for 1 hour or more. An amorphous magnesium carbonate was thus synthesized, which was designated as Sample E.

The conversion from the normal magnesium carbonate to the amorphous magnesium carbonate was confirmed from the results obtained by differential thermal analysis. This amorphous magnesium carbonate had a BET specific surface area of 40 $m^2/g$ and an average particle diameter of 1 μm.

EXAMPLE 13

Twenty parts of the amorphous magnesium carbonate (Sample E), 80 parts of water and 0.4 part of sodium hexametaphosphate were mixed, and dispersed for 30 minutes or more using a power homogenizer. Next, an aqueous solution containing 14 parts (as solid content) of polyvinyl alcohol (PVA117; produced by Kuraray Co., Ltd.) was mixed with the above dispersion of spherical basic magnesium carbonate, followed by stirring to prepare a coating solution.

The above coating solution was applied to a commercially available PET film by means of a bar coater so as to give a dry coating weight of 20 $g/m^2$, followed by drying to obtain a recording medium of the present invention.

EXAMPLE 14

The coating solution as prepared in Example 13 was applied to a substrate comprising a commercially available wood free paper (trade name: Ginwa; produced by Sanyo-Kokusaku Pulp Co., Ltd.) by means of a bar coater in an amount of 15 $g/m^2$ as a dry coating weight, followed by drying to give a recording medium of the present invention.

EXAMPLE 15

A coating solution prepared in the same manner as in Example 13 except that 6 parts in 20 parts of the amorphous magnesium carbonate used in Example 12 was replaced with alumina (produced by Sumitomo Chemical Co., Ltd; trade name: AKP-G; γ-alumina; average particle diameter: 0.5 μm; BET specific surface area: 140 $m^2/g$), was applied to a substrate comprising a commercially available wood free paper (trade name: Ginwa; produced by Sanyo-Kokusaku Pulp Co., Ltd.) by means of a bar coater in an amount of 15 $g/m^2$ as a dry coating weight, followed by drying to give a recording medium of the present invention.

EXAMPLE 16

A recording medium of the present invention was prepared in the same manner as in Example 15 except that 2 parts of a dimethylallylammonium chloride/sulfur dioxide copolymer (trade name: PAS-A-120L; produced by Nitto Boseki Co., Ltd.) was further added to the coating solution as used in Example 13.

Ink-jet recording suitability of the above recording mediums was evaluated by carrying out ink-jet recording using an ink-jet printer having ink-jet heads corresponding to 4 colors of Y (yellow), M (magenta), C (cyan) and Bk (black), provided with 128 nozzles at intervals of 16 nozzles per 1 mm and capable of ejecting ink droplets by the action of heat energy, and using an ink having the following composition.

| Composition of ink | |
|---|---|
| Dye | 5 parts |
| Diethylene glycol | 20 parts |

-continued

| | |
|---|---|
| Water | 78 parts |
| Dye | |
| Y: C.I. Direct Yellow 86 | |
| M: C.I. Acid Red 35 | |
| C: C.I. Direct Blue 199 | |
| Bk: C.I. Food Black 2 | |

Evaluation was made on the items show below.

(1) Image density:

Black (Bk) image density of solid prints obtained using the above ink-jet printer was measured using a Macbeth reflection densitometer RD-918.

(2) Indoor storage stability:

Printed material were stuck on the outside of a window facing north of an office, and left to stand for 1 month and 3 months. Differences ($\Delta E^*_{Bk}$) between the chromaticity of images observed immediately after printing (before leaving) and the chromaticity of images observed after leaving were found and were used as bases for the evaluation of indoor storage stability. Results obtained are shown in Table 10.

The place at which the prints were stuck were confirmed not to be exposed to direct sunlight or rain throughout the year and also the air was circulated.

TABLE 10

| Recording medium Example: | Image density OD(Bk) | Indoor storage stability After 1 month ΔE* Bk/C/R/G/Bl | After 3 months ΔE* Bk/C/R/G/Bl |
|---|---|---|---|
| 13 | 1.42 | 1.9/6.0/3.0/4.3/5.5 | 4.2/9.0/6.5/7.0/8.8 |
| 14 | 1.40 | 1.9/6.5/3.3/5.0/6.0 | 4.3/10.5/7.5/8.0/9.8 |
| 15 | 1.45 | 2.0/7.5/3.4/6.0/7.5 | 4.5/12.5/6.8/8.2/12.0 |
| 16 | 1.40 | 1.9/7.5/3.8/6.0/7.0 | 4.1/11.0/7.0/8.0/10.2 |

EXAMPLES 17 TO 20, COMPARATIVE EXAMPLES 4 TO 6

Substrates were prepared, each comprising a base paper with a basis weight of 80 $g/m^2$, a thickness of 100 μm and a degree of Stockigt sizing of from 0 to 2 seconds, containing calcium carbonate as a loading material in an amount of 7.0% in terms of the amount of ash content measured according to JIS-P-8128.

Coating solutions having the following compositions were each applied to the above base paper by bar coating so as to give a dry coating weight of 5 $g/m^2$, followed by drying at 110° C. for 5 minutes. Recording mediums of the present invention and for making comparison were thus obtained.

| (Composition of coating solution) - All in terms of solid content except for water - | |
|---|---|
| Pigment | 54 parts |
| Polyvinyl alcohol (PVA-117; produced by Kuraray Co., Ltd; degree of saponification: 98%; degree of polymerization: 1,700) | 36 parts |
| Dimethyldiallylammonium chloride/acrylamide copolymer (PAS J-41; produced by Nitto Boseki Co., Ltd.) | 10 parts |
| Water | 1,000 parts |

Pigments used were each obtained by mixing the following particles in the proportion as shown in Table 11.

TABLE 11

| | Example | | | | Comparative Example | | |
|---|---|---|---|---|---|---|---|
| Pigment | 17 | 18 | 19 | 20 | 4 | 5 | 6 |
| F | 7 | 5 | 3 | 2 | 10 | 8 | 0 |
| G | 3 | 5 | 7 | 8 | 0 | 2 | 10 |

Pigment F: Aluminum oxide particles (finely powdered alumina, AKP-G, produced by Sumitomo Chemical Co., Ltd.; average particle diameter: 0.5 μm; BET specific surface area: 137 $m^2/g$)
Pigment G: Basic magnesium carbonate particles (basic magnesium carbonate, Type-S, produced by Ube Chemical Industries, Ltd.; average particle diameter: 16 μm; BET specific surface area: 46 $m^2/g$)

Ink-jet recording suitability of the above recording mediums was evaluated by carrying out ink-jet recording using an ink-jet printer having ink-jet heads corresponding to 4 colors of Y (yellow), M (magneta), C (cyan) and Bk (black), provided with 128 nozzles at intervals of 16 nozzles per 1 mm and capable of ejecting ink droplets by the action of heat energy, and using an ink having the following composition.

| Composition of ink | |
|---|---|
| Dye | 3 parts |
| Ethylene glycol | 5 parts |
| Diethylene glycol | 25 parts |
| Water | 67 parts |

Dye
Y: C.I. Direct Yellow 86
M: C.I. Acid Red 35
C: C.I. Direct Blue 199
Bk: C.I. Food Black 2

Evaluation was made on the items show below.

(1) Color reproduction range:

The hue and chroma of each of yellow (Y), magenta (M), cyan (C) and red (R) (color mixture of Y and M), green (G) (color mixture of Y and C), blue (Bl) (color mixture of M and C of solid prints obtained using the above printer were measured using a color analyzer CA-35 (manufactured by Murakami Sikisai Kagaku Kenkyusho K. K.). Numerical values for M and R are shown in Table 12.

(2) Image storage stability:

Prints obtained in the above (1) were stuck on the outside of a window facing north of an office, and left to stand for 1 month and 3 months. In respect of the solid printed areas of Bk, Y, M and C, differences ($\Delta E^*$) between the chromaticity of images observed immediately after printing and the chromaticity of images observed after leaving were found and were used as bases for the evaluation of image storage stability. Values for Bk and C are shown in Table 12.

Figure 5:
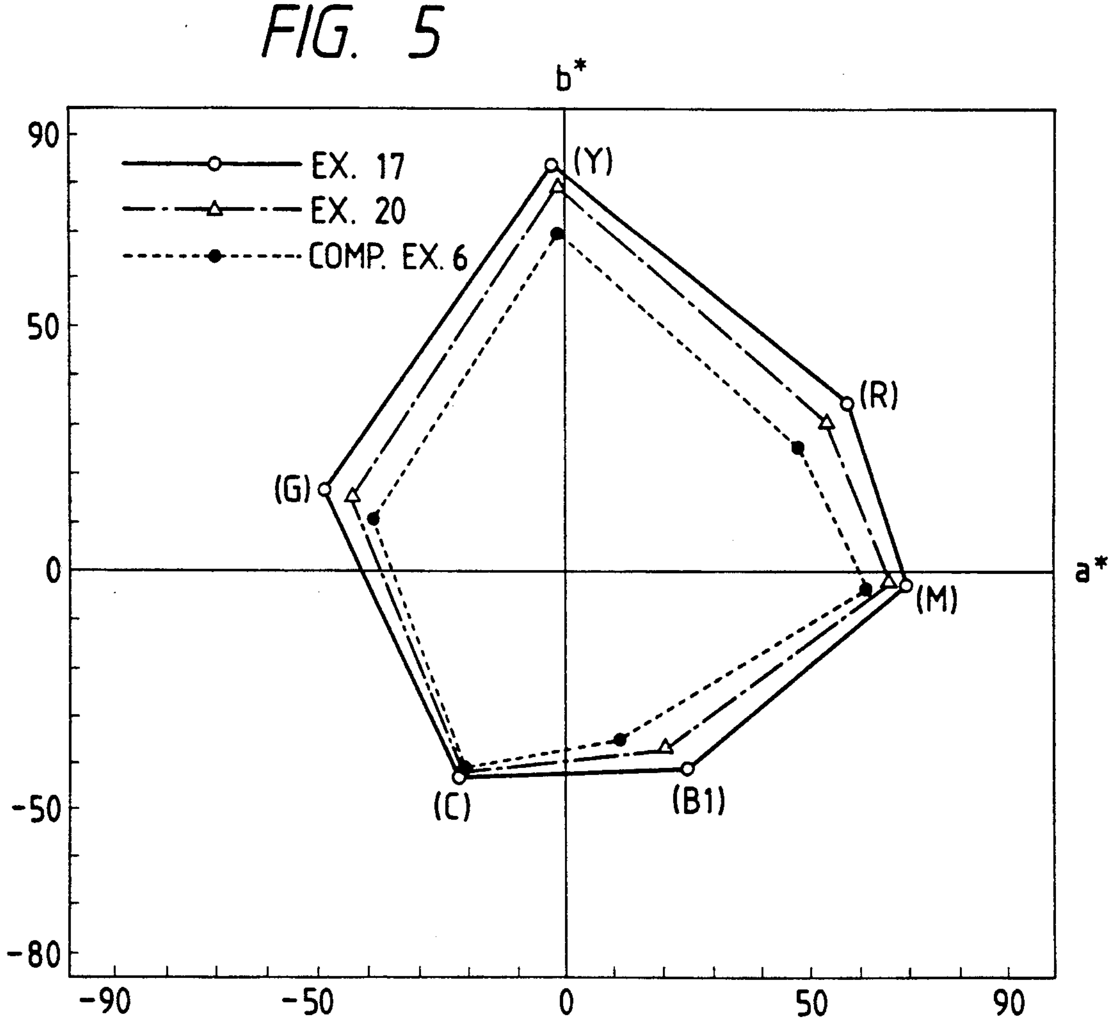
FIG. 5 is a chromaticity diagram to show the color reproduction ranges measured on recording mediums according to Examples 17 and 20 and Comparative Example 6.

The place at which the printed material were stuck were confirmed not to be exposed to direct sunlight or rain throughout the year and also the air was circulated. In regard to Examples 17 and 20 and Comparative Example 6, FIG. 5 shows the color reproduction ranges on the chromaticity diagram.

EXAMPLES 21 AND 22, COMPARATIVE EXAMPLES 7 AND 8

Recording mediums of the present invention and of comparative examples were obtained in the same manner as in Example 17 except that a commercially available wood free paper (trade name: Ginwa; produced by Sanyo-Kokusaku Pulp Co., Ltd.) was used as the base paper and the ink-receiving layer formed on the base paper was made to have a dry coating weight of 15 $g/m^2$.

The mixing ratios of the above two kinds of pigments were made as follows:

Example 21: F/G=7/3
Example 22: F/G=2/8
Comparative Example 7: F/G=10/0
Comparative Example 8: F/G=0/10.

EXAMPLES 23 AND 24, COMPARATIVE EXAMPLES 9 AND 10

Recording mediums of the present invention and of comparative examples were obtained in the same manner as in Example 17 except that the pigments F and G were replaced with the following pigments H and I and the mixing ratios were set to be the same as in Examples 21 and 22 and Comparative Examples 7 and 8.

Pigment H: Ultra-finely powdered alumina (trade name: Aerosil aluminum oxide-C; produced by Degussa Japan Co., Ltd.; average particle diameter: 20 nm; BET specific surface area: 100 $m^2/g$)

Pigment I: Basic magnesium carbonate (trade name: Kinsei; produced by Kamishima Kagaku K. K.; average particle diameter: 5.9 μm; BET specific surface area: 26 $m^2/g$).

Results of the above evaluation are shown together in Table 13.

COMPARATIVE EXAMPLE 11

As an example for making comparison with conventionally known recording mediums, a comparative recording medium was obtained in the same manner as in Example 17 except that the pigment used therein was replaced with finely powdered silica (trade name: Finesil X-37; produced by Tokuyama Soda Co., Ltd.; average particle diameter: 2.5 μm; BET specific surface area: 260 $m^2/g$).

TABLE 12

| | Mixing ratio | Color reproduction range | | | |
|---|---|---|---|---|---|
| | | M | | R | |
| | | Hue | Chroma | Hue | Chroma |
| Comparative Example: | | | | | |
| 4 | 10/0 | 358° | 73 | 32° | 74 |
| 5 | 8/2 | 358° | 71 | 31° | 72 |
| Example: | | | | | |
| 17 | 7/3 | 358° | 70 | 30° | 70 |
| 18 | 5/5 | 358° | 69 | 30° | 68 |
| 19 | 3/7 | 358° | 68 | 30° | 66 |
| 20 | 2/8 | 358° | 67 | 30° | 63 |
| Comparative Example: | | | | | |
| 6 | 0/10 | 358° | 62 | 29° | 54 |

| | Mixing ratio | Image storage stability | | | | | |
|---|---|---|---|---|---|---|---|
| | | OD(Bk) | Bk ΔE* | C ΔE* | R ΔE* | G ΔE* | Bl ΔE* |
| Comparative Example: | | | | | | | |
| 4 | 10/0 | 1.38 | 15.4 | 25.6 | 13.5 | 18.0 | 23.8 |
| 5 | 8/2 | 1.36 | 9.3 | 21.7 | 12.0 | 15.0 | 19.8 |
| Example: | | | | | | | |
| 17 | 7/3 | 1.34 | 2.5 | 5.7 | 2.5 | 4.0 | 5.9 |
| 18 | 5/5 | 1.32 | 2.0 | 4.4 | 2.3 | 3.6 | 5.5 |
| 19 | 3/7 | 1.30 | 1.7 | 3.7 | 2.2 | 3.0 | 4.8 |
| 20 | 2/8 | 1.28 | 1.6 | 3.6 | 1.5 | 2.5 | 4.0 |
| Comparative Example: | | | | | | | |
| 6 | 0/10 | 1.24 | 1.6 | 3.4 | 2.0 | 2.4 | 2.6 |

TABLE 13

| | Mixing ratio | Color reproduction range M Hue | M Chroma | R Hue | R Chroma |
|---|---|---|---|---|---|
| Comparative Example: | | | | | |
| 7 | 10/0 | 358° | 71 | 32° | 76 |
| Example: | | | | | |
| 21 | 7/3 | 358° | 68 | 30° | 72 |
| 22 | 2/8 | 358° | 67 | 30° | 68 |
| Comparative Example: | | | | | |
| 8 | 0/10 | 358° | 59 | 29° | 57 |
| 9 | 10/0 | 359° | 74 | 32° | 75 |
| Example: | | | | | |
| 23 | 7/3 | 358° | 70 | 31° | 71 |
| 24 | 2/8 | 358° | 67 | 29° | 64 |
| Comparative Example: | | | | | |
| 10 | 0/10 | 356° | 60 | 29° | 52 |
| 11 | Silica | 0° | 72 | 30° | 74 |

| | Mixing ratio | Image storage stability OD(Bk) | Bk ΔE* | C ΔE* | R ΔE* | G ΔE* | Bl ΔE* |
|---|---|---|---|---|---|---|---|
| Comparative Example: | | | | | | | |
| 7 | 10/0 | 1.35 | 21.7 | 30.5 | 15.0 | 17.0 | 25.5 |
| Example: | | | | | | | |
| 21 | 7/3 | 1.32 | 3.8 | 6.0 | 2.6 | 4.1 | 6.0 |
| 22 | 2/8 | 1.25 | 2.5 | 4.3 | 1.4 | 2.0 | 4.0 |
| Comparative Example: | | | | | | | |
| 8 | 0/10 | 1.20 | 2.3 | 4.2 | 1.5 | 3.0 | 3.4 |
| 9 | 10/0 | 1.16 | 12.3 | 20.5 | 10.0 | 13.0 | 18.3 |
| Example: | | | | | | | |
| 23 | 7/3 | 1.37 | 1.9 | 4.3 | 1.5 | 2.0 | 3.7 |
| 24 | 2/8 | 1.25 | 1.4 | 2.9 | 1.3 | 1.8 | 3.3 |
| Comparative Example: | | | | | | | |
| 11 | 0/10 | 1.15 | 1.1 | 2.6 | 1.3 | 1.8 | 3.0 |
| 12 | Silica | 1.45 | 35.4 | 42.0 | 19.5 | 23.0 | 32.4 |

We claim:

1. A recording medium comprising a substrate and an ink-receiving layer provided on said substrate; said ink-receiving layer containing an aluminum oxide (V) and a basic magnesium carbonate (VI) contained in a proportion of (V)/(VI) of from 1/5 to 3/1.

2. A recording medium according to claim 1, wherein said ink-receiving layer contains a binder.

3. A recording medium according to claim 2, wherein said basic magnesium carbonate (VI) and aluminum oxide (V) and said binder (IV) are contained in a proportion of (V)+(VI)/(IV) of from 10/1 to 1/4.

4. A recording medium comprising a substrate which comprises a base paper capable of absorbing an ink and, provided on said substrate, an ink-receiving layer containing an aluminum oxide (V) and a basic magnesium carbonate (VI) in a proportion of (V)/(VI) of from 1/5 to 3/1.

5. A recording medium according to claim 4, wherein said aluminum oxide has a specific surface area of from 40 $m^2/g$ to 200 $m^2/g$.

6. A recording medium according to claim 4, wherein said aluminum oxide has an average particle diameter of from 0.001 μm to 10 μm.

7. A recording medium according to claim 4, wherein said basic magnesium carbonate has a specific surface area of from 10 $m^2/g$ to 170 $m^2/g$.

8. A recording medium according to claim 4, wherein said basic magnesium carbonate has an average particle diameter of from 1 μm to 20 μm.

9. A recording medium according to claim 4, which further comprises a dye fixing agent.

10. A recording medium according to claim 4, wherein part of the surface of said substrate is uncovered with said ink-receiving layer.

11. A recording medium according to claim 4, wherein said ink-receiving layer contains a binder.

12. A recording medium according to claim 4, wherein said basic magnesium carbonate (VI) and aluminum oxide (V) and said binder (IV) are contained in a proportion of (V)+(VI)/(IV) of from 10/1 to 1/4.

* * * * *

UNITED STATES PATENT AND TRADEMARK OFFICE
CERTIFICATE OF CORRECTION

PATENT NO. : 5,246,774

DATED : September 21, 1993

INVENTOR(S) : Sakaki et al.

It is certified that error appears in the above-identified patent and that said Letters Patent is hereby corrected as shown below:

COLUMN 1:

Line 35, "have" should read --has--;
Line 45, "in respect of," should read --with respect to,--; and
Line 48, "in respect of" should read --with respect to--.

COLUMN 3:

Line 29, "less" should read --lesser--.

COLUMN 6:

Line 57, "have" should read --has--;
Line 58, "bring" should read --brings--; and
Line 59, "tend" should read --tends--.

COLUMN 7:

Line 6, "pigment" should read --pigments--;
Line 7, "ment" should read --ments--; and
Line 9, "includes" should read --include--.

UNITED STATES PATENT AND TRADEMARK OFFICE

CERTIFICATE OF CORRECTION

PATENT NO. : 5,246,774 Page 2 of 2

DATED : September 21, 1993

INVENTOR(S) : Sakaki et al.

It is certified that error appears in the above-identified patent and that said Letters Patent is hereby corrected as shown below:

COLUMN 10:

Line 53, "become" should read --becomes--.

COLUMN 17:

Line 2, "is" should read --are--.

COLUMN 18:

Line 63, "was" should read --were--.

COLUMN 20:

Line 16, "material" should read --materials--.

COLUMN 21:

Line 52, "material" should read --materials--.

Signed and Sealed this

Fourteenth Day of June, 1994

Attest:

Bruce Lehman

BRUCE LEHMAN

Attesting Officer

Commissioner of Patents and Trademarks